United States Patent
Max et al.

(10) Patent No.: US 11,853,065 B2
(45) Date of Patent: Dec. 26, 2023

(54) METHOD AND DRIVER ASSISTANCE SYSTEM FOR ASSISTING A DRIVER OF A VEHICLE WITH DRIVING OF THE VEHICLE

(71) Applicant: Volkswagen Aktiengesellschaft, Wolfsburg (DE)

(72) Inventors: Stephan Max, Gifhorn (DE); Thorben Günzel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 193 days.

(21) Appl. No.: 16/721,382

(22) Filed: Dec. 19, 2019

(65) Prior Publication Data
US 2020/0201334 A1 Jun. 25, 2020

(30) Foreign Application Priority Data
Dec. 20, 2018 (DE) ...................... 10 2018 222 601.6

(51) Int. Cl.
G05D 1/02 (2020.01)
G08G 1/01 (2006.01)
G08G 1/16 (2006.01)

(52) U.S. Cl.
CPC ......... *G05D 1/0212* (2013.01); *G08G 1/0129* (2013.01); *G08G 1/166* (2013.01); *G05D 2201/0213* (2013.01)

(58) Field of Classification Search
CPC ......... G05D 1/0212; G05D 2201/0213; G08G 1/0129; G08G 1/166; G08G 1/164;
(Continued)

(56) References Cited

U.S. PATENT DOCUMENTS

| 8,849,552 B2 | 9/2014 | Schunder et al. ............ 701/117 |
| 9,373,255 B2 | 6/2016 | Strauß et al. |

(Continued)

FOREIGN PATENT DOCUMENTS

| CN | 101334845 A | * 12/2008 | ......... G06K 9/00785 |
| CN | 101334845 A | 12/2008 | ............... G06K 9/62 |

(Continued)

OTHER PUBLICATIONS

German Office Action, Application No. 102018222601.6, 7 pages, dated Oct. 2, 2019.

*Primary Examiner* — Aniss Chad
*Assistant Examiner* — Christopher George Fees
(74) *Attorney, Agent, or Firm* — Slayden Grubert Beard PLLC (57) ABSTRACT

A method for assisting a driver of a vehicle with driving of the vehicle is disclosed, in which the surroundings of the vehicle are detected. The detection of the surroundings comprises the course of driving paths as well as movement data relating to other road users. Historic data obtained at least from past driving maneuvers by road users in the detected surroundings are called up for the surroundings, the detected surroundings of the vehicle are analyzed and a traffic situation of the vehicle in relation to at least one second road user of the other detected road users is determined. A likely driving maneuver of the second road user is predicted based on the called-up historic data and the current traffic situation, and a control signal for assisting the driver with driving of the vehicle is generated depending on the predicted driving maneuver of the second road user.

19 Claims, 2 Drawing Sheets

(58) Field of Classification Search
CPC .. G08G 1/0125; G08G 1/0112; G08G 1/0145; G08G 1/096708; G08G 1/161; G08G 1/167; B60W 30/09; B60W 40/04; B60W 50/0097; B60W 2554/4045; B60W 2555/60; B60W 2556/10; B60W 30/0956
See application file for complete search history.

(56) References Cited

U.S. PATENT DOCUMENTS

| | | | |
|---|---|---|---|
| 9,934,688 | B2 | 4/2018 | Olson et al. |
| 10,156,850 | B1 * | 12/2018 | Ansari ................ B60W 30/095 |
| 10,268,191 | B1 * | 4/2019 | Lockwood ............ G05D 1/0038 |
| 2016/0061625 | A1 * | 3/2016 | Wang ................. G01C 21/3697 |
| | | | 701/454 |
| 2017/0031361 | A1 * | 2/2017 | Olson .................... G08G 1/167 |
| 2017/0131719 | A1 * | 5/2017 | Micks ............... B60W 60/0015 |
| 2017/0278390 | A1 * | 9/2017 | Zydek .................. B60W 30/00 |
| 2021/0094547 | A1 * | 4/2021 | Garcia ............. B60W 60/0015 |
| 2021/0096575 | A1 * | 4/2021 | Xie ................... B60W 50/0097 |

FOREIGN PATENT DOCUMENTS

| | | | | |
|---|---|---|---|---|
| DE | 10334620 | A1 | 2/2005 | ............ B60K 31/00 |
| DE | 102011082761 | A1 | 3/2012 | ............ G01C 21/26 |
| DE | 102011113019 | A1 | 5/2012 | ............ B60W 30/08 |
| DE | 102012009297 | A1 * | 12/2012 | ............ B60W 50/14 |
| DE | 102012009297 | A1 | 12/2012 | ............ B60W 30/08 |
| DE | 102012208254 | A1 | 11/2013 | .............. G08G 1/01 |
| DE | 102013213006 | A1 | 1/2015 | ............ B60W 30/08 |
| DE | 102015219467 | A1 | 4/2016 | ............ G06Q 50/30 |
| DE | 102016113903 | A1 | 3/2017 | ............ B60W 40/04 |
| EP | 2289754 | A1 | 3/2011 | ................ B60T 7/22 |
| JP | 2002190092 | A | 7/2002 | ............ B60R 21/00 |

* cited by examiner

METHOD AND DRIVER ASSISTANCE SYSTEM FOR ASSISTING A DRIVER OF A VEHICLE WITH DRIVING OF THE VEHICLE

CROSS-REFERENCE TO RELATED APPLICATIONS

This application claims priority to German Patent Application No. DE 10 2018 222 601.6, filed on Dec. 20, 2018 with the German Patent and Trademark Office. The contents of the aforesaid Patent Application are incorporated herein for all purposes.

TECHNICAL FIELD

The present invention relates to a method for assisting a driver of a vehicle with driving of the vehicle. In the method, the surroundings of the vehicle are detected. The detection of the surroundings comprises the course of driving paths as well as movement data relating to other road users. The invention further relates to a driver assistance system for assisting a driver of a vehicle with driving of the vehicle. The system comprises a surroundings detection apparatus for detecting the surroundings of the vehicle. The surroundings detection apparatus is designed to detect the course of driving paths as well as movement data relating to other road users.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A method for creating a current situation image in a region of traffic is disclosed in DE 10 2012 208 254 A1. In the method, surroundings data, map data and/or position data relating to a large number of vehicles, which describe a locally restricted situation, are sent to a database. The surroundings data are recorded by means of surroundings sensors or vehicle sensors, the map data are read out from a digital memory and the position data are determined by means of a global satellite positioning system. In the method, the data transmitted to the database are continuously fused with a situation image already present in the database so as to produce an up-to-date situation image.

A method for operating a central server, which enables central management of rule maps containing traffic rules, is disclosed in DE 10 2015 219 467 A1. The rule map can be sent by the central server to a vehicle. Moreover, a vehicle can identify the state of the environment by means of a number of surroundings sensors, derive traffic rules based on the state of the environment, generate a rule map based at least on the traffic rules and send the rule map to the central server.

A system by means of which the driving behavior of other vehicles is gleaned is disclosed in DE 10 2016 113 903 A1. The driving behavior is then analyzed and the probability of a possible planned driving route can be determined.

A method for assisting the driver of a vehicle in current traffic situations in the traffic is disclosed in DE 103 34 620 A1. In the method, information about road signs is recorded in synchronization with the current driving movement. Road sign information is then evaluated with regard to relevance, prioritization, street/vehicle topology and consistency aspects such that supportive notifications can be issued to the driver.

Finally, DE 10 2011 082 761 A1 describes a method by means of which a vehicle characteristic can be detected and saved.

SUMMARY

During driving of the vehicle, the movements of other road users should be taken into consideration. It is especially vital that collisions with other road users are prevented. This applies both to a human driver and to partially or fully automated driving of the vehicle by a driver assistance system or an autonomous vehicle. By a method according to embodiments of the invention and a driver assistance system according to embodiments of the invention, the driver of a vehicle is in particular intended to be assisted in such traffic situations in which a collision with another moving road user may occur. The assistance of the driver may thereby consist in a control signal being provided to a control device for partially automated or fully automatic driving.

An object of the present invention is therefore to provide a method and a driver assistance system using which the driver of a vehicle may be assisted in preventing collisions with other moving road users. However, in the process, the driving flow of the vehicle should not be interfered with unnecessarily during the traffic event by notifications or intervention in the movement behavior of the vehicle.

This object is solved by a method and by a driver assistance system according to the independent claims. Various embodiments of the invention are the discussed in the dependent claims and the following description.

In a method according to one exemplary aspect of the invention, the surroundings of a vehicle are detected (also referred to as 'own vehicle' in the following), the detection of the surroundings comprising the course of driving paths as well as movement data relating to other road users. Historic data obtained at least from past driving maneuvers by road users in the detected surroundings are called up for said surroundings. The detected surroundings of the vehicle are analyzed and a traffic situation of the vehicle in relation to at least one second road user of the other detected road users is determined. Subsequently, a likely driving maneuver of the second road user is predicted based on the called-up historic data and the current traffic situation. Finally, a control signal for assisting the driver with driving of the vehicle is generated depending on the predicted driving maneuver of the second road user.

The details of one or more embodiments are set forth in the accompanying drawings and the description below. Other features will be apparent from the description, drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

As discussed in the preceding and in a method according to one exemplary aspect, the surroundings of the vehicle are detected, the detection of the surroundings comprising the course of driving paths as well as movement data relating to other road users. Historic data obtained at least from past driving maneuvers by road users in the detected surroundings are called up for said surroundings. The detected surroundings of the vehicle are analyzed and a traffic situation of the vehicle in relation to at least one second road user of the other detected road users is determined. Subsequently, a likely driving maneuver of the second road user is predicted based on the called-up historic data and the current traffic situation. Finally, a control signal for assisting the driver with driving of the vehicle is generated depending on the predicted driving maneuver of the second road user.

The movement data relating to the other road users may for example comprise the temporal course of the position of another road user. The road user is for example another vehicle, a cyclist or a pedestrian. The driving path may be a road or a lane on a road in corresponding embodiments. The driving paths may be detected by sensors of the vehicle. Alternatively or additionally and in corresponding embodiments, they may be determined by a saved digital map based on the current position of the vehicle. The movement data relating to the other road users are for example determined by sensors of the vehicle.

In the method according to the present aspect, a likely driving maneuver of another road user is predicted. In this way, a potential collision with said road user is intended to be prevented. The likely driving maneuver of the other road user is not only derived from the current direction and speed of movement of the other road user, historic data containing information about past driving maneuvers of road users in the relevant surroundings is also taken into consideration in order to predict the likely driving maneuver. This way, the likely driving maneuver can be better estimated. For example, it can be reliably predicted as to whether a vehicle will soon brake in order to stop in a timely manner at a known stopping point at an intersection in order to give way to the own vehicle used. Furthermore, in this way, it can be better determined whether, in a current traffic situation in which the position and the speed of the vehicle, the reaction time of the respective drivers and a possible braking behavior are known, the own vehicle has likely been overlooked by the second road user such that the right of way of the own vehicle may likely be ignored by the other road user. In this case, the generated control signal of the own vehicle would cause same to surrender its right of way or carry out an emergency braking procedure.

Moreover, by taking into account the historic data and by analyzing the current traffic situation, a control signal may for example be generated which does not alter the movement of the vehicle unnecessarily and equally does not provide unnecessary notifications to the driver of the vehicle, since the likely behavior of other road users can be estimated better based on the historic data.

In some embodiments and in order to generate the historic data for a geographical region, movement data relating to a large number of road users are recorded multiple times at least within a time interval. Traffic situations in the geographical region are analyzed and driving maneuvers assigned to the traffic situations are determined based on the recorded movement data relating to the large number of road users. The determined driving maneuvers are saved in conjunction with the determined traffic situations as historic data. These method steps thus may be carried out in advance, i.e., prior to the above-mentioned steps of the method according to the present aspect. Beneficially, the historic data generated in this manner assist with reliable prediction of likely driving maneuvers of another road user in a current traffic situation determined in the method according to the present aspect. These embodiments therefore relate to generating historic data, which are subsequently called up in the method according to the present aspect.

During generation of the historic data, e.g., varied movement data relating to vehicles within a region in which driving paths of various road users may intersect, i.e., for example in the region of intersections and junctions of a street into another street, are recorded. Right-of-way rules may be ascertained for these traffic situations based on road signs or general traffic rules in some embodiments. Data on said right-of-way rules may also be contained in the historic data. However, right-of-way situations may also be determined for the vehicles and localized within the geographical region based on the movement data relating to the detected road users, independently of said general traffic rules or traffic rules that depend on road signs. A large number of driving maneuvers of the detected road users, e.g., detected vehicles, may also be saved for these right-of-way situations. A statistical analysis of the driving maneuvers may be used to determine which driving maneuver a vehicle is most likely to carry out in a specific traffic situation. For example, it may be determined when a vehicle on a road on which they do not have right of way over vehicles on another road starts to brake before the junction in the other street and how the braking procedure unfolds. The historic data thus represent knowledge of how vehicles in a specific traffic situation, for example at an intersection, are most likely to move.

If, based on the movement data of a currently detected vehicle of the second road user and on a geographical map for the surroundings of the vehicle, a traffic situation in which a right-of-way rule should be applied arises for the own vehicle, in some embodiments, the application of the right-of-way rule may be estimated and evaluated using the historic data and the movement data relating to other road users. The evaluation of the traffic situation then leads to the prediction of the behavior of another road user, for example the second road user.

The historic data are updated continuously in some embodiments. If the own vehicle then enters particular surroundings, there are therefore up-to-date, i.e., recently recorded, historic data on driving maneuvers carried out by vehicles in the past. Said data are beneficially used to predict the driving maneuver of the second road user in a traffic situation that also arose when the historic data were recorded.

In some embodiments, the historic data are saved in a geographical map that comprises the driving paths as well as the traffic rules that apply to the driving paths and the driving maneuvers carried out in the past by road users on the driving paths. Said geographical map comprising the historic data may then be called up for the traffic situation determined in the method according to the present aspect. Beneficially, the historic data therefore, e.g., may comprise a geographical map having a network of driving paths, the traffic rules that apply to the driving paths and driving maneuvers carried out on the driving paths.

The geographical map in which the historic data are saved may already be called up in some embodiments for detecting the surroundings of the vehicle. The driving paths can in this case be extracted from the called-up geographical map. For this purpose, it is necessary to know the position of the vehicle.

The traffic situations in some embodiments are each assigned traffic rules. The traffic rules that apply to the driving paths in the detected surroundings of the vehicle may be identified in some embodiments. A traffic situation may therefore in particular comprise the course of the driving paths, the assigned traffic rule and the movement data relating to the vehicle and to the other road users. In some embodiments, the method assists the driver of the vehicle in this way for example in traffic situations in which there is the risk of a collision with another road user.

In some embodiments, the traffic rule assigned to the traffic situation is obtained by means of the historic data from past driving maneuvers by road users. In some embodiments, it is possible to obtain a traffic rule when generating the historic data. The traffic rule can namely be derived from road signs and general rules for driving paths. However, it is also possible to only derive traffic rules from the detected driving maneuvers in some embodiments. This may for example be beneficial if there is no road sign or general rule for correct behavior, but substantially all vehicles follow a specific rule. For example, a driver may recognize that they are on a priority road even if there is no road sign that overrides the left-yields-to-right rule for a junction of a very small road. If, however, it is detected during generation of the historic data that substantially all vehicles that want to drive onto the other road from the small road stop and wait, it can be assumed that the other road is a priority road. Said traffic rule can then be saved in the historic data.

Of the traffic rules assigned to the traffic situations, at least one of the traffic rules is a right-of-way rule. Right-of-way rules serve to prevent collisions between road users. Assisting the driver in a traffic situation involving a right-of-way rule therefore serves to prevent collisions with other road users.

In some embodiments, when predicting the driving maneuver of the second road user, the movement data relating to the second road user are compared with movement data relating to a past driving maneuver of a road user who was in the same traffic situation. Alternatively or additionally and in some embodiments, the past driving maneuver may also have been generated by a statistical analysis of a large number of past driving maneuvers. In this way, a very reliable prediction of the likely driving maneuver of the second road user can be produced.

In some embodiments, when predicting the driving maneuver of the second road user, it is checked based on the movement data relating to the second road user and the detected traffic situation as to whether the second road user is likely to follow the particular traffic rule. Normally, every road user will follow the traffic rules in a current traffic situation. Even if, for example, two vehicles on different driving paths approach one another such that a collision would occur if the movement data were to progress in the same manner, it is normally not necessary to warn the driver of the vehicle or to intervene in the course of movement if the check produces the result that the second road user will likely follow the traffic rule for the traffic situation. However, if by comparison with the historic data it is determined that there is a deviation between the current driving maneuver of the second road user and driving maneuvers obtained for the historic data, the check may produce the result that the second road user will likely not follow the traffic rule. In this case, a control signal that assists the driver of the vehicle in this traffic situation can be generated. Said control signal may also intervene directly in the movement of the vehicle. For example, an emergency braking procedure may be implemented in some embodiments.

In some embodiments, a point in time at which the control signal is generated is determined for the traffic situation depending on the predicted driving maneuver of the second road user and/or depending on the particular traffic situation. For example, said point in time depends on whether the second road user carries out a driving maneuver that deviates from an assigned driving maneuver in the historic data. Equally, a position at which the control signal is generated may be determined.

If the own vehicle approaches an intersection with a right-of-way rule, for example, it is determined whether or not another vehicle has the right of way. If the left-yields-to-right rule applies, for example, it is determined whether the own vehicle is approaching the other vehicle from the right or from the left. When generating the control signal, it is also important that said signal does not unnecessarily interfere with the movement of the vehicle. A situation in which a control signal that directly or indirectly alters the course of movement of the vehicle during a normal sequence of movements of the road users in a traffic situation should be prevented. If, for example, there is an intersection at which the vehicle must give way to a vehicle approaching from the right, but said vehicle has right of way over a vehicle approaching from the left and in some embodiments, the control signal may be generated at different points in time or at different positions of the vehicle depending on whether the second road user is approaching the intersection from the right or from the left. If, during detection of the surroundings, movement data relating to a second vehicle that is approaching from the left are recorded, it is assumed that the driver of said vehicle will give way. Even if an extrapolation of the movement data relating to the vehicles produces the risk of a collision, it is not necessary to generate a control signal for preventing the collision, provided that the movement data relating to the second vehicle correspond, within a certain tolerance range, to a driving maneuver saved in the historic data for this intersection. The control signal must only be generated in order to be able to assist the driver of the vehicle in a timely manner if a deviation from the driving maneuver in the historic data is identified. However, the control signal is not generated too early and without this being necessary. If, on the other hand, a vehicle approaching from the right to which the own vehicle should give way is detected during detection of the surroundings, the control signal is already generated at an earlier point in time than in the case of a vehicle approaching from the left. This way, it is beneficially ensured that the own vehicle can brake in a timely manner in order to give way to the vehicle approaching from the right.

In some embodiments, features of the surroundings are extracted from geostatic data during detection of the surroundings of the vehicle. The geostatic data are assigned to objects that do not move. Based on said geostatic data, the determination of the position of the vehicle by means of satellite navigation, for example, may be improved.

Moreover, during detection of the surroundings of the vehicle, a driving behavior of the vehicle and/or other road users can be analyzed in some embodiments. Features of the surroundings are then for example extracted from data relating to the analyzed driving behavior of the vehicle and from data relating to the analyzed driving behavior of other road users. The driving behavior in particular comprises the location and movement of the own vehicle and of the vehicle of another road user.

In some embodiments, data are transmitted from the other road user to the vehicle for the analysis of the driving behavior of other road users. The data may for example be transmitted via a direct communication link from the other road user to the vehicle (vehicle-to-vehicle communication). For example, the data may be transmitted by means of direct mobile communication from the other road user to the vehicle. Moreover, so-called edge nodes of a mobile network may be provided for the data transmission.

It is thereby for example possible to record the movement data of other road users more quickly and more accurately.

If, for example, the second road user is a second vehicle and in some embodiments, data relating to actuation of an apparatus of the second vehicle are transmitted to the vehicle. During prediction of the driving maneuver of the second vehicle, the transmitted data on the actuation of the apparatus of the second vehicle are then taken into consideration. The data transmitted to the vehicle may for example comprise actuations of apparatuses of the second vehicle that have an influence on the movement of the vehicle. Said apparatuses are, for example, the gas pedal, brake pedal, steering wheel and/or the switch for actuating the turn signal. This way, it is possible for the movement of the second vehicle to have already been calculated at a point in time at which the sensors of the vehicle were still not able to detect a change of movement of the second vehicle. For example, proceeding from the actuation of the brake pedal of the second vehicle, a future speed reduction of the second vehicle can already be detected or predicted in the own vehicle if the reduction of speed has not yet occurred or could not yet be detected.

In some embodiments, the movement of the vehicle is controlled in an automated manner by the generated control signal. The automated intervention in the movement of the vehicle may take place within the scope of a fully automated journey of the vehicle or within the scope of a partially automated journey of the vehicle, in which an emergency braking procedure is for example carried out by means of the control signal if it emerges from the predicted driving maneuver of the second road user that said road user will likely not abide by the traffic rule determined for the detected traffic situation. Alternatively or additionally and in some embodiments, a notification can be issued to the driver of the vehicle by the generated control signal. Said notification may be a visual or acoustic information message or warning message in some embodiments.

In another aspect, a driver assistance system for assisting a driver of a vehicle with driving of the vehicle is provided that comprises a surroundings detection apparatus for detecting the surroundings of the vehicle, which apparatus is designed to detect the course of driving paths as well as movement data relating to other road users. Furthermore, the driver assistance system comprises an analysis unit, which is coupled to the surroundings detection apparatus and is designed to analyze the detected surroundings of the vehicle and to determine a traffic situation of the vehicle and at least one traffic rule for the traffic situation of the vehicle in relation to at least one second road user of the other detected road users. Furthermore, the driver assistance system has a memory, in which historic data on driving maneuvers by road users for traffic situations are saved, and an interface, which is coupled to the memory such that historic data on driving maneuvers by road users can be called up for the particular traffic situation. The driver assistance system additionally comprises a prediction unit, which is coupled to the analysis unit and to the interface and is designed to predict a driving maneuver of the second road user based on the called-up historic data and the current traffic situation. Finally, the driver assistance system comprises a control unit, which is coupled to the prediction unit and is designed to generate a control signal for assisting the driver with driving of the vehicle depending on the predicted driving maneuver of the second road user.

The driver assistance system according to the present aspect in some embodiments is designed to carry out the method according to one or more of the embodiments, discussed in the preceding.

The surroundings detection apparatus for example may comprise a large number of sensors, which are housed in the vehicle. Moreover, additionally or alternatively and in some embodiments, the surroundings detection apparatus may also access vehicle-external sensors via the interface. Equally, the surroundings detection apparatus may in some embodiments, if applicable, access a geographical map comprising driving paths via the interface.

The memory in which the historic data are saved may be arranged outside the vehicle in corresponding embodiments. It may for example be a central server, which can provide a large number of vehicles with historic data on particular geographical regions in which the respective vehicles are located. Accordingly, the interface in some embodiments may be a wireless communication interface, in particular an interface for mobile communication.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

An initial prerequisite for carrying out the method of the following embodiments is for historic data to have been generated, which historic data are used when carrying out the method in a current traffic situation.

In the following, it will firstly be described how the historic data are initially generated; reference will thereby be made to FIG. 1.

Figure 1:
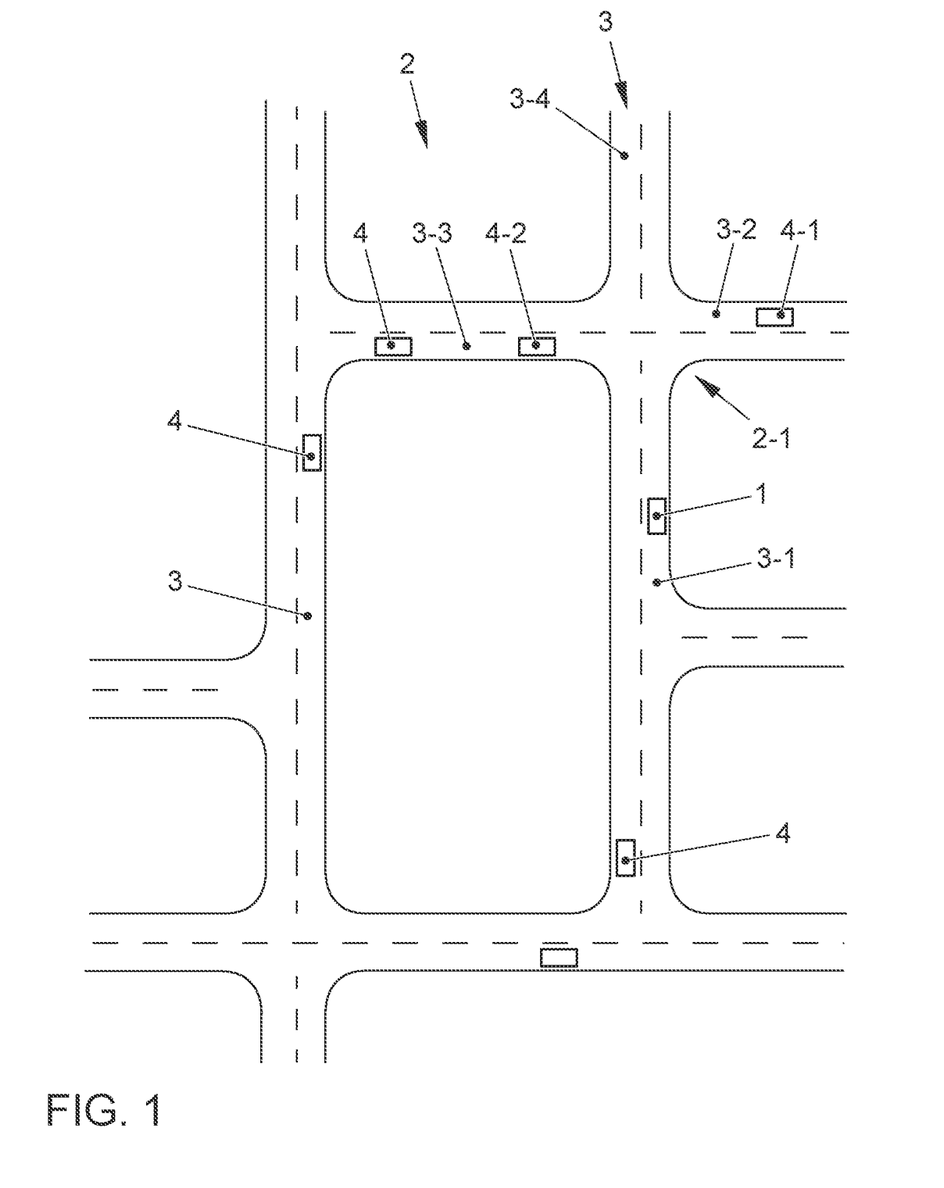
FIG. 1 schematically shows a geographical region in which an exemplary embodiment is carried out.

Within a specific geographical region, there is a road network 2 with driving paths 3 that may comprise a plurality of lanes on which vehicles designated in FIG. 1 by the reference signs 4 or 4-1 and 4-2 can move. A digital geographical map for the road network is saved in a central memory. The digital map comprises information on the geographical course of the road network 2 and additional information on said road network 2. Traffic rules that apply to the road network 2 form part of the additional information. In this regard, information is saved about road signs on the roads represented by the saved road network 2. The information as to which vehicle has right of way when two vehicles cross one another, such as at a road intersection or a junction of a road into another road, are in particular included in the traffic rules.

Furthermore, vehicles 4 constantly send movement data to a central memory when they are located in the relevant geographical region. The movement data comprise, inter alia, an anonymized identifier of the sending vehicle 4, the current position of the vehicle 4 and a time stamp. In addition, the current speed of the vehicle 4 and data from sensors of the vehicle 4 that detect the environment and the surroundings can also be sent to the central memory.

The data of the central memory are analyzed such that traffic situations within the geographical region are analyzed by a large number of vehicles 4. Moreover, driving maneuvers assigned to the traffic situations are determined. Said data are saved as historic data in the central memory.

The right-of-way rule that a vehicle approaching from the right has right of way over a vehicle approaching from the left is for example stored for the intersection 2-1. The movement data are constantly detected by vehicles 4 approaching the intersection 2-1 on the driving paths 3-1, 3-2, 3-3 and 3-4. If, for example, a vehicle 4 approaches the intersection 2-1 on the driving path 3-1 without there being another vehicle 4 approaching the intersection 2-1 on the driving paths 3-1 or 3-3, said vehicle 4 will typically brake at a certain distance before the intersection 2-1, traverse the intersection 2-1 at a slower speed and then accelerate again. However, if another vehicle 4 is approaching the intersection 2-1 on the driving path 3-2, the vehicle 4 on the driving path 3-1 will again brake at a certain distance before the intersection 2-1, but will then stop before the intersection 2-1 such that the vehicle 4 on the driving path 3-2 can pass over the intersection 2-1. Only then will the vehicle 4 on the driving path 3-1 pass over the intersection 2-1. If, however, only one vehicle is approaching the intersection 2-1 on the driving path 3-3, the vehicle 4 on the driving path 3-1 will slow down at a certain distance before the intersection 2-1, but will then pass over the intersection 2-1 at a lower speed and then accelerate again in spite of the vehicle 4 approaching on the driving path 3-3. Said movement data relating to the vehicles 4 on the driving paths 3-1 to 3-4 are put in a temporal relationship and in a relationship with the traffic rule that applies at the intersection 2-1. The traffic rule is verified based on the data and the driving maneuvers of individual vehicles 4 on the driving paths 3-1 to 3-3 are saved for the various above-mentioned traffic situations when said vehicles approach the intersection 2-1. A statistical analysis is carried out for the large number of driving maneuvers determined successively for the various traffic situations, by means of which statistical analysis a typical driving maneuver is determined for a specific traffic situation. Tolerance values for the movement data can also be saved for said typical driving maneuver.

If no right-of-way rule can be derived from the traffic rules for a traffic situation, the right-of-way rule is obtained from the detected driving maneuvers of a large number of vehicles and is saved as being associated, for example, with an intersection of the road network 2.

Said historic data are continuously updated and saved in the central memory.

Figure 2:
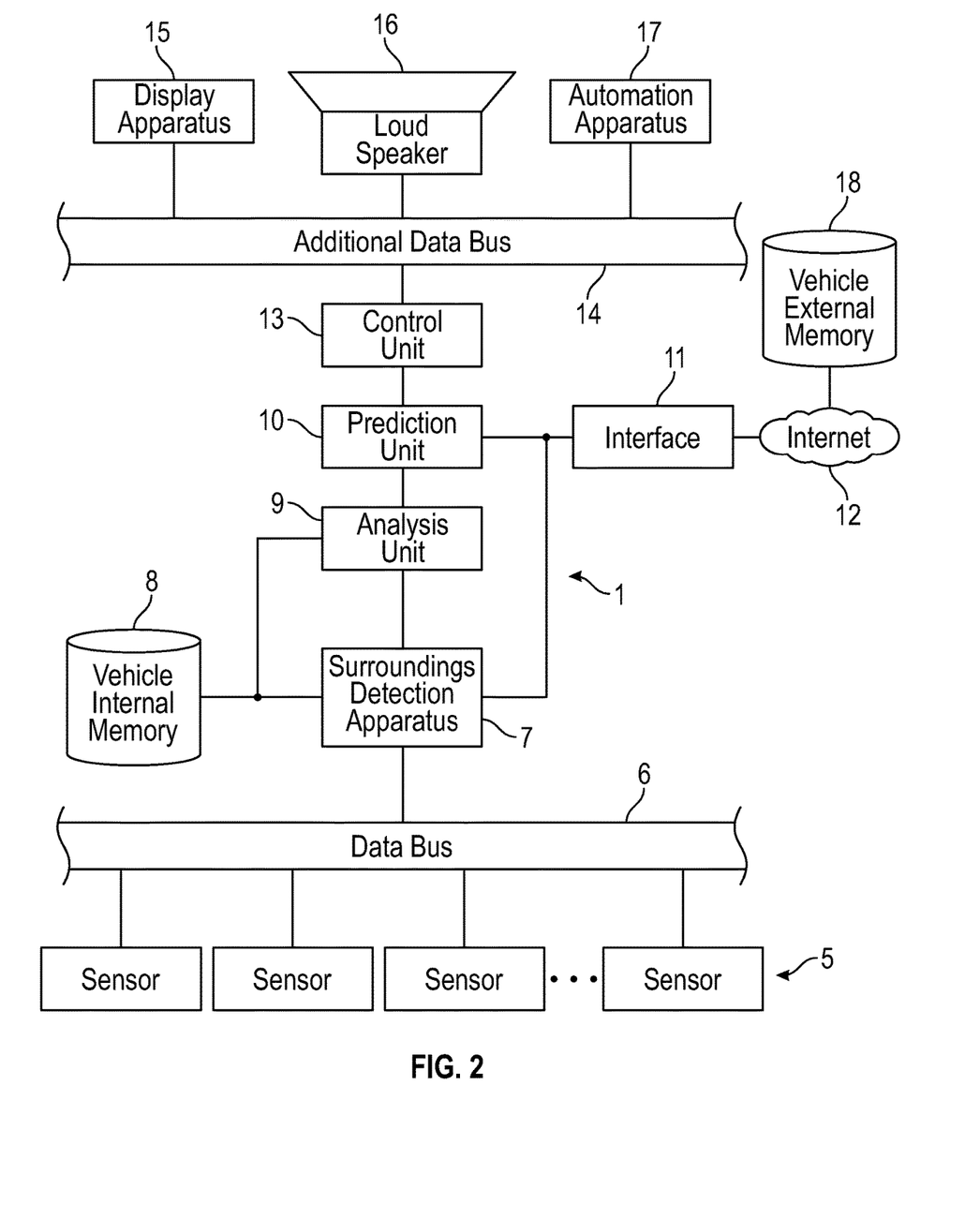
FIG. 2 shows the design of the exemplary embodiment of the driver assistance system.

With reference to FIGS. 1 and 2, an exemplary embodiment of a driver assistance system and an exemplary embodiment of a method for assisting a driver will be explained in the following.

The starting point of the method is the point at which the above-described historic data are saved in the vehicle-external central memory 18. A vehicle 1 approaching the intersection 2-1 on the driving path 3-1 shall now be considered. The vehicle 1 comprises a large number of sensors 5, by means of which the surroundings of the vehicle 1 are detected. The sensors 5 in particular comprise a plurality of cameras for the surroundings, radar sensors and LIDAR sensors. Further, the sensors 5 comprise a position determination sensor, by means of which the current position of the vehicle 1 can be determined via a satellite navigation system. Aside from the position of the vehicle 1 itself, the course of the driving paths 3-1 to 3-4 as well as movement data relating to other road users 4 are also detected during detection of the surroundings. A vehicle 4-1 approaching the intersection 2-1 on the driving path 3-2 and a vehicle 4-2 approaching the intersection 2-1 on the driving path 3-3 are two of said other road users 4.

The sensors 5 are coupled to a data bus 6 of the vehicle 1, via which they transmit the obtained data to a surroundings detection apparatus 7. Said apparatus extracts features from geostatic data, as a result of which the road infrastructure, in particular, is detected, as well as features of the driving behavior of the own vehicle 1 and features of the driving behavior of the vehicles 4-1 and 4-2 in the surroundings of the vehicle 1. At the current position of the vehicle 1, the surroundings detection apparatus 7 calls up a geographical map via the Internet 12 from the vehicle-external memory 18 via an interface 11 of the vehicle 1, unless this geographical map is saved in the vehicle-internal memory 8 of the vehicle 1.

The surroundings detection apparatus 7 transmits the data on the detected surroundings of the vehicle 1 to an analysis unit 9. The analysis unit 9 analyzes the data on the detected surroundings of the vehicle 1 and determines a traffic situation of the vehicle 1 and a traffic rule for the traffic situation of the vehicle 1 in relation to one or more vehicles 4-1, 4-2 of the other vehicles 4.

With regard to the traffic rule for the traffic situation, the analysis unit 9 can also access the geographical map transmitted from the vehicle-external central memory 18 or the geographical map saved in the vehicle-internal memory 8.

The data generated by the analysis unit 9 are transmitted to a prediction unit 10 of the vehicle 1. Data on the surroundings of the vehicle 1 and on the current traffic situation in which the vehicle 1 finds itself as well as the movement data relating to other vehicles 4-1 and 4-2 involved in the traffic situation are therefore present in the prediction unit 10. The prediction unit 10 calls up historic data on the detected surroundings for this traffic situation. The prediction unit 10 then compares the currently detected traffic situation with the traffic situations for the intersection 2-1 obtained from the movement data relating to past driving maneuvers by vehicles. In the case shown in FIG. 1, traffic situations in which a vehicle approaches the intersection 2-1 on the driving path 3-1 while other vehicles approach the intersection 2-1 on the driving paths 3-2 and 3-3 are therefore identified in the historic data. Moreover, the driving maneuvers performed by the vehicles involved are extracted from the historic data for this traffic situation.

In the case shown in FIG. 1, the movement data for the second vehicle 4-1 and the third vehicle 4-2 approaching the intersection 2-1 are therefore obtained in relation to the movement data of the vehicle 1 approaching the intersection 2-1 on the driving path 3-1. In the process, it is checked whether or not the second 4-1 or third vehicle 4-2 is likely to follow the traffic rule assigned to the traffic situation for the intersection 2-1. The analysis unit 9 then predicts a likely driving maneuver of the second 4-1 and third vehicle 4-2 based on the called-up historic data and the current traffic situation. If the movement data relating to the vehicles 4-1 and 4-2 coincide with the movement data relating to driving maneuvers from the historic data for this traffic situation, with a certain tolerance range optionally being taken into consideration, the vehicles 4-1 and 4-2, in terms of the likely driving maneuver thereof, will be predicted to move in the same manner as shown in the historic data for past driving maneuvers by vehicles in corresponding traffic situations.

In the example shown in FIG. 1, the right-of-way rule that applies at the intersection 2-1 is that of a vehicle approaching from the right having right of way. Therefore, the driving maneuver of the second vehicle 4-1 is likely to be that of said vehicle slowing down at a certain distance from the intersection 2-1, but then passing over the intersection 2-1 at a lower speed without stopping and continuing straight ahead or turning to the right, for example. The driving maneuver of the third vehicle 4-2 is likely to be that of said vehicle slowing down at a certain distance from the intersection 2-1 and stopping before the intersection 2-1 in order to give way to the vehicle 1 also approaching the intersection 2-1. Said data are transmitted from the prediction unit 10 to the control unit 13.

The control unit 13 then generates a control signal for assisting the driver with driving of the vehicle 1 in the determined traffic situation depending on the predicted driving maneuver of the second vehicle 4-1 and third vehicle 4-2. If the driver of the vehicle 1 is responsible for the task of driving, said control signal is transmitted to a display apparatus 15 and/or a loudspeaker 16 via the additional data bus 14. In this way, a notification, for example an information message or warning message, can be issued to the driver of the vehicle 1.

Moreover, a point in time and a position at which the control signal is generated and transmitted to the additional data bus 14 immediately afterward is determined by the control unit 13 for the traffic situation depending on the predicted driving maneuver of the second vehicle 4-1 or third vehicle 4-2. Said point in time or said position are selected such that a collision with another vehicle 4 can in any case be prevented either by means of automated intervention in the movement of the vehicle 1 or by issuing a warning message. At the same time, unnecessary notifications that could potentially distract the driver of the vehicle 1 are prevented from being issued.

For example, the notification that a second vehicle 4-1 which has right of way is approaching the intersection 2-1 from the right can be issued via the display apparatus 15. If the likely driving maneuver of the third vehicle 4-2 is determined as being that of the course of movement of said third vehicle 4-2 deviating from the saved driving maneuvers of the historic data such that the third vehicle 4-2 will likely not stop at the intersection 2-1, but rather will likely not give way to the vehicle 1 and will pass over the intersection 2-1 without stopping, a visual and acoustic warning can be issued via both the display apparatus 15 and via the loudspeaker 16 by means of the control signal generated by the control unit 13.

If the vehicle 1 comprises an automation apparatus 17, which can for example carry out an automatic emergency braking procedure or which can control the vehicle 1 in a fully automatic manner, the control signal is also transmitted to said automation apparatus 17 via the additional data bus 14 such that said apparatus controls the vehicle 1 in accordance with the control signal. The automation apparatus 17 may for example initiate an emergency braking procedure if it has been determined that the third vehicle 4-2 will not give way. Moreover, the movement of the vehicle 1 can be controlled such that the vehicle 1 gives way to the second vehicle 4-1 by stopping before the intersection 2-1 until the second vehicle 4-1 has passed over the intersection 2-1.

In another exemplary embodiment, not only are the historic data saved in the vehicle-external memory 18 transmitted to the prediction unit 10, data are also exchanged between the individual vehicles 1 and 4. For the analysis of the driving behavior of the second 4-1 and third vehicle 4-2, data on an actuation of apparatuses of the vehicle 4-1 or 4-2 that have an influence on the movement of the vehicle are transmitted to the vehicle 1. If the gas pedal or brake pedal is actuated in a certain way in one of the vehicles 4-1 or 4-2, this is communicated to the vehicle 1. Equally, actuation of the steering wheel and/or actuation of the turn signal switch in the second 4-1 and third vehicle 4-2 can also be detected and communicated to the vehicle 1. For example, the data can be exchanged directly between the vehicles 1 and 4 via a direct communication link via the Internet 12 or a mobile network. So-called edge nodes of a mobile network can be used for this purpose.

This way, the prediction unit 10 can predict the likely driving maneuver of the second vehicle 4-1 or third vehicle 4-2 even better.

REFERENCE NUMBER LIST

1 Vehicle
2 Road network
2-1 Intersection
3 Driving paths
3-1 Driving path
3-2 Driving path
3-3 Driving path
3-4 Third vehicle
4 Vehicles of other road users
4-1 Second vehicle
4-2 Third vehicle
5 Sensors
6 Data bus
7 Surroundings detection apparatus
8 Vehicle-internal memory
9 Analysis unit
10 Prediction unit
11 Interface
12 Internet
13 Control unit
14 Additional data bus
15 Display apparatus
16 Loudspeaker
17 Automation apparatus
18 Vehicle-external memory The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method of driver assistance of a vehicle comprising:
  detecting the surroundings of the vehicle using one or more sensors of the vehicle and obtaining surroundings data, comprising data on a current road section of the vehicle, driving paths data, and movement data relating to other current road users of the current road section; wherein the one or more sensors comprise a position sensor, configured to determine the current position of the vehicle;

receiving historic data comprising information on at least past driving maneuvers by previous road users of the current road section of the vehicle;

determining a current traffic situation of the vehicle in relation to at least one second current road user of the other detected current road users;

determining one or more traffic rules assigned to the current traffic situation by evaluating the current traffic situation;

determining a historic traffic situation from the historic data, which historic traffic situation is comparable to the determined current traffic situation of the vehicle in relation to the at least one second current road user;

determining the likelihood of the second road user to follow the determined one or more traffic rules;

predicting a driving maneuver of the second road user based on the historic traffic situation, the movement data, the one or more traffic rules, the determined likelihood, and the current traffic situation;

generating a control signal for assisting the driver with driving of the vehicle depending on the predicted driving maneuver of the second road user to prevent a potential collision with the second road user; and updating the historic data using at least the current traffic situation.

2. The method of claim 1, wherein in order to generate the historic data for a geographical region, movement data relating to a large number of road users are recorded multiple times at least within a time interval;

traffic situations in the geographical region are analyzed and driving maneuvers assigned to the traffic situations are determined based on the recorded movement data relating to the number of road users; and the determined driving maneuvers are saved in conjunction with the determined traffic situations as historic data comprising historic traffic situations.

3. The method of claim 2, wherein the historic data are saved in a geographical map that comprises the driving paths as well as the traffic rules that apply to the driving paths and the driving maneuvers carried out in the past by road users on the driving paths, and the geographical map comprising the historic data is called up for the determined traffic situation.

4. The method of claim 2, wherein the traffic situations are each assigned traffic rules.

5. The method of claim 2, wherein when predicting the driving maneuver of the second road user, the movement data relating to the second road user are compared with historic movement data relating to a past driving maneuver of a road user who was in the same traffic situation.

6. The method of claim 1, wherein the historic data are saved in a geographical map that comprises the driving paths as well as a traffic rule that applies to the driving paths and the driving maneuvers carried out in the past by road users on the driving paths, and the geographical map comprising the historic data is called up for the determined traffic situation.

7. The method of claim 6, wherein the traffic situations are each assigned traffic rules.

8. The method of claim 1, wherein at least one of the traffic rules is a right-of-way rule.

9. The method of claim 1, wherein when predicting the driving maneuver of the second road user, the movement data relating to the second road user are compared with historic movement data relating to a past driving maneuver of a road user who was in the same traffic situation.

10. The method of claim 1, wherein one or more of a point in time and a position at which the control signal is generated is determined for the traffic situation depending on the predicted driving maneuver of the second road user and/or depending on the particular traffic situation.

11. The method of claim 1, wherein during detection of the surroundings of the vehicle, one or more of a driving behavior of the vehicle and a driving behavior of other road users is analyzed.

12. The method of claim 1, wherein data are transmitted from the other road user to the vehicle for the analysis of the driving behavior of other road users.

13. The method of claim 12, wherein the second road user is a second vehicle;

data on an actuation of an apparatus of the second vehicle are transmitted to the vehicle; and during prediction of the driving maneuver of the second vehicle, the transmitted data relating to the actuation of an apparatus of the second vehicle are taken into consideration.

14. The method of claim 13, wherein the data transmitted to the vehicle comprise actuations of apparatuses of the second vehicle that have an influence on the movement of the vehicle.

15. The method of claim 1, wherein the movement of the vehicle is controlled in an automated manner using the generated control signal.

16. The method of claim 1, wherein at least one of the traffic rules is a right-of-way rule.

17. The method of claim 1, wherein the historic data is based on movement data from position sensors of a large number of road users for a geographical region.

18. The method of claim 1, wherein the step of predicting the driving maneuver of the second road user is based on a statistical analysis of the past driving maneuvers.

19. A driver assistance system for assisting a driver of a vehicle with driving of the vehicle, comprising:

one or more sensors for detecting the surroundings of the vehicle and obtaining surroundings data, which surrounding data comprises data on a current road section of the vehicle, driving paths data, and movement data of other road users and which one or more sensors comprise a position sensor, configured to determine the current position of the vehicle;

a memory, in which historic data on at least past driving maneuvers by previous road users of the current road section of the vehicle are saved;

an analyzer, which is coupled to the one or more sensors and is configured to:

determine a current traffic situation of the vehicle in relation to at least one second current road user of the other detected current road users; and to determine one or more traffic rules for the current traffic situation in relation to the at least one second road user of the other detected road users; which one or more traffic rules are determined by evaluating the current traffic situation;

the analyzer being further configured to determine a historic traffic situation from the historic data that is comparable to the determined current traffic situation of the vehicle in relation to the at least one second current road user; and to determine the likelihood of the second road user to follow the determined one or more traffic rules;

a prediction circuit, which is coupled to the analyzer and is configured to predict a driving maneuver of the second road user based on the historic traffic situation, the movement data, the one or more traffic rules, the determined likelihood, and the current traffic situation; and a controller, which is coupled to the prediction circuit and is configured to generate a control signal for assisting the driver with driving of the vehicle depending on the predicted driving maneuver of the second road user to prevent a potential collision with the second road user; wherein the driver assistance system is further configured to update the historic data using at least the current traffic situation.

* * * * *